No. 659,383. Patented Oct. 9, 1900.
B. J. WARREN.
FISH GAFF.
(Application filed Apr. 11, 1900.)
(No Model.)
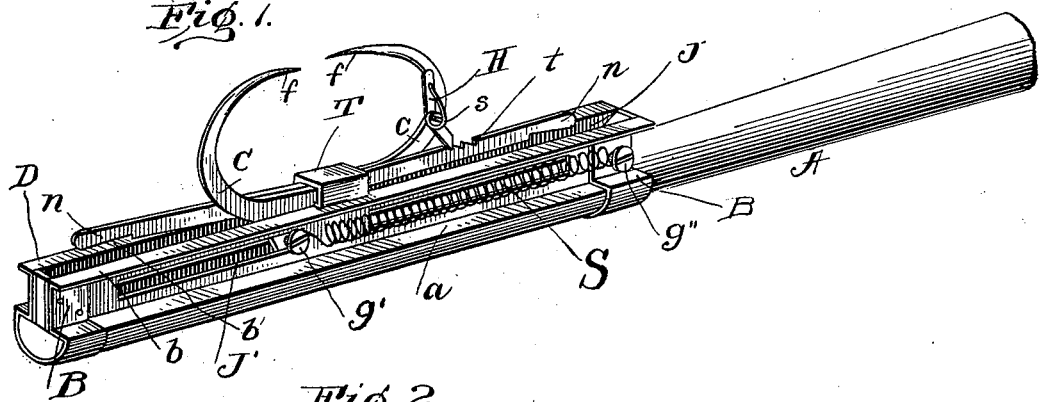
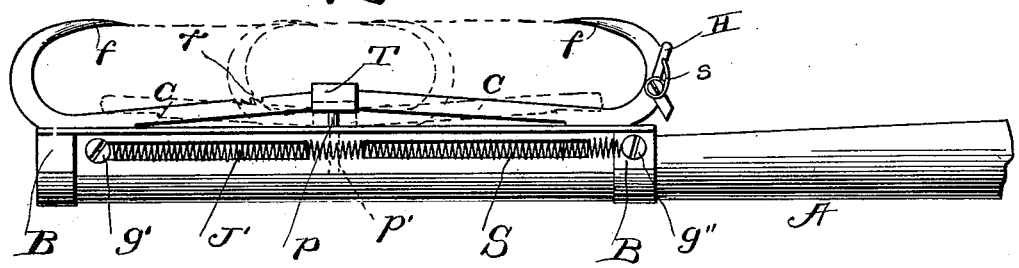
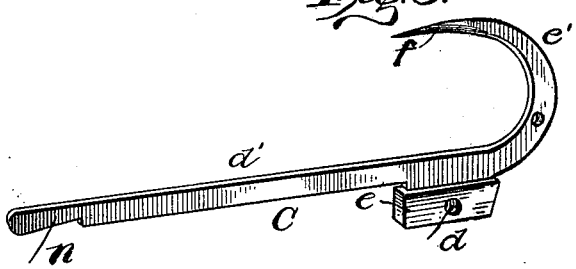
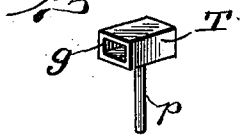
Witnesses.
Allan H. Foote.
Joseph W. Burr
Inventor.
Bernard J. Warren
by Henry L. Bryan
his Atty.
THE NORRIS PETERS CO., PHOTO-LITHO., WASHINGTON, D. C.

UNITED STATES PATENT OFFICE.

BERNARD JEROME WARREN, OF DOVER, MAINE.

FISH-GAFF.

SPECIFICATION forming part of Letters Patent No. 659,383, dated October 9, 1900.

Application filed April 11, 1900. Serial No. 12,406. (No model.)

*To all whom it may concern:*

Be it known that I, BERNARD JEROME WARREN, a citizen of the United States, residing at Dover, in the county of Piscataquis and State of Maine, have invented certain new and useful Improvements in Fish-Gaffs; and I do hereby declare the following to be a full, clear, and exact description of the invention, such as will enable others skilled in the art to which it appertains to make and use the same.

My invention relates to a fish-gaff that may be employed to spear a fish after it has been caught on a line and drawn to the surface of the water, the object thereof being to produce a simple, reliable, and durable device of superior convenience that may be safely handled; and said invention consists of a gaff comprising corresponding but oppositely-arranged spear members that are slidingly mounted and supported for longitudinal reciprocating movement and which are adapted to be retracted in opposite directions and automatically locked at the termination of said rearward movement and which may be simultaneously operated to project rapidly toward each other in a given line to allow the spears to close together to strike the fish from opposite sides.

Reference is to be had to the accompanying drawings, forming a part of this specification, in which similar characters of reference indicate corresponding parts in the several views.

Figure 1 is a perspective view of my device shown as applied to a handle and indicating the spear members thereof in a normal closed position, while Fig. 2 represents a side elevation showing the spear members set ready for operation. Fig. 3 shows in perspective a spear-member part, while Fig. 4 shows in detail a guide-block or trigger-piece.

In a gaff characterized by my invention I preferably employ a handle A, having a flattened side or longitudinally-depressed flattened portion $a$, to which is attached, by means of clamps B B, a slotted longitudinally-extending supporting frame-piece D, that is shown as comprising slotted side pieces $b\ b'$, which are held in spaced parallelism by the said clamps. This frame D is adapted to provide centrally at the top and each side ways J J' for the reception of the guiding parts of the sliding members C. The sliding or spear members C are formed each to provide at the end portion carrying the spear a depending supporting arm or heel $e$, having a screw-hole $d$ and a longitudinally-projecting guide and lock arm $d'$, that extends at right angles to said arm $e$ and which is provided at its free end with an inclined notch $n$. $e'$ represents an oppositely-extending arm that is bent up and tapered, as shown, to provide a spear-point $f$. The spear members thus constructed are mounted within the central slot J to present reversely-bent and inwardly-projecting spear-blades, while the arm $e$ is so seated within said slot that the screw-hole $d$ therein is adapted to register with the elongated slot J' of the adjacent side piece and that is adapted to receive a screw $g'$, passed through said slot, which when attached as shown in Figs. 1 and 2 serves as a retaining guide means, which allows of the longitudinal reciprocating movement of the spear member within the limits prescribed by the length of said slot. When thus seated, the respective spear members present the guiding and locking arms $d'$ in a position of parallelism and overlapping contact in the same vertical plane in order that the spear-points, which are turned toward each other, may be positively maintained when separated, as shown in Fig. 2, and may travel when brought together in a given horizontal line $x$, and these lever members are maintained in such relationship by means of the guide-block or trigger-piece T, which normally rests upon the top face of the frame D and which is substantially rectangular in cross-section, as shown at $g$ in Fig. 4, and within which said levers slidably fit. The piece T is provided with a depending pin $p$, that is adapted to fit a corresponding hole $p'$, that extends downwardly into said frame at a point midway of its ends and which allows of the vertical movement of said block-piece when lifted or depressed.

S S represent coiled springs that are respectively arranged in opposition to the respective spear members, one end of which is attached to the screw $g'$, while the other end thereof may be anchored to the screw $g''$, that serves to retain the clamp B'. From this construction it will readily be seen that by the rearward extension or movement of said members, or rather the movement in a direction of opposition to the respective coiled springs, the arms $e$ $e$ thereof being loosely mounted and being subject to the force action of the respective springs naturally turn on the heel thereof in a direction to lift or cause the upward tipping of the respective levers $d'$, which latter on account of their frictional bearing or binding at their power ends against the embracing guide-block tend to lift said block to the position shown in Fig. 2—i. e., to a point where the levers have been extended to their outmost limits and have been tilted up—whereupon the inclined notches at the free ends thereof are allowed to engage the guide-block and hold the parts locked in the position shown in Fig. 2. The slightest pressure on either the guide-block or trigger T or the spear-arms when the parts are thus set in open position will release the arms, and the spears will be forcibly projected by the reacting driving-springs toward each other and brought into juxtaposition to gaff the fish.

H represents a pawl pivoted to one side of the bent-up portion of one of the members and that is held in operative position by a spring $s$, secured as shown in Fig. 1, while the free end of the pawl engages with the notched or ratchet face $t$ on the upper edge of the adjacent lever-arm $d'$.

From this construction it will be seen that when the spear members have closed together to fetter the fish the spring-controlled pawl is thrown into engagement with the ratchet-teeth to close upon the fish and prevent the escape of the fish from its impaled position.

Having described my invention, what I desire to claim as new and useful is—

In a fish-gaff, a pair of reversely-positioned spears supported for longitudinal reciprocating movement in a frame, springs acting to move said spears in a closing direction, and means for automatically locking said spears in an open position, combined and operating substantially as set forth.

In testimony whereof I affix my signature in presence of two witnesses.

BERNARD JEROME WARREN.

Witnesses:
FRANCIS C. PARKS,
WILLIAM T. ELLIOTT.